(12) United States Patent
McGary et al.

(10) Patent No.: US 8,483,382 B2
(45) Date of Patent: Jul. 9, 2013

(54) SYSTEM AND METHOD FOR REAL-TIME COMPARISON OF NEWS EVENTS AGAINST DIRECTORY ASSISTANCE QUERIES

(75) Inventors: Faith McGary, Katy, TX (US); Alexis Tabora Adorable, Surigao del Sur (PH)

(73) Assignee: Grape Technology Group, Inc., Bethlehem, PA (US)

( * ) Notice: Subject to any disclaimer, the term of this patent is extended or adjusted under 35 U.S.C. 154(b) by 958 days.

(21) Appl. No.: 12/460,896

(22) Filed: Jul. 24, 2009

(65) Prior Publication Data

US 2010/0040220 A1     Feb. 18, 2010

Related U.S. Application Data

(60) Provisional application No. 61/135,906, filed on Jul. 24, 2008.

(51) Int. Cl.
*H04M 3/42*     (2006.01)
(52) U.S. Cl.
USPC .................................. 379/218.01; 379/265.09

(58) Field of Classification Search
USPC ........... 379/265.09, 218.01, 207.12; 707/203, 707/3
See application file for complete search history.

(56) References Cited

U.S. PATENT DOCUMENTS

| | | | |
|---|---|---|---|
| 6,381,324 B1* | 4/2002 | Shaffer et al. | 379/211.02 |
| 7,212,615 B2* | 5/2007 | Wolmuth | 379/88.22 |
| 2005/0060311 A1* | 3/2005 | Tong et al. | 707/7 |
| 2006/0143242 A1* | 6/2006 | Hara | 707/203 |

* cited by examiner

*Primary Examiner* — Amal Zenati
(74) *Attorney, Agent, or Firm* — Sofer & Haroun, LLP (57) ABSTRACT

A system for responding to queries has an interface for receiving request communications from requesters. An agent platform is configured to receive the request communications and to provide replies to the requesters. A tracking module tracks the request communications and the replies and a news module tracks news events. A correlation module correlates increases in request communications relative to a first news event over a set time frame. An analysis module generates a search assistance routine based on the correlated increases in request communications relative to the first news events over a set time frame, where the search assistance routine is activated when a second news event is detected, similar to the first news event.

14 Claims, 6 Drawing Sheets

SYSTEM AND METHOD FOR REAL-TIME COMPARISON OF NEWS EVENTS AGAINST DIRECTORY ASSISTANCE QUERIES

RELATED APPLICATION

This application claims the benefit of priority from U.S. Provisional Patent Application No. 61/135,906, filed on Jul. 24, 2008, the entirety of which is incorporated by reference.

BACKGROUND

1. Field of the Invention

This application relates to directory queries. More particularly, the present application relates to a system and method for improving the speed and quality of directory query replies.

2. Description of Related Art

Directory assistance refers generally to any form of query issued by a requester to an agent, either live agent or automated agent, submitted either telephonically or electronically. Early directory assistance systems were typically telephonic request systems, that included requests issued to live agents seeking an unknown telephone number of a desired party. Thereafter, automated agents/operators sometimes replaced live operators, incoming requests and outgoing replies were sent electronically instead of via telephone and the amount of available searchable data increased from simple contact information requests to cover a request for information about nearly any available topic. For the purposes of this application, directory assistance covers any request for information (including contact information for a desired party), submitted telephonically or electronically, that is handled by a live or automated agent.

In such prior art directory assistance systems it has always been considered desirable to maintain various system metrics regarding the various types of queries directed to the system. For example, a directory assistance system may track the number of calls per time frame, types and frequencies of concierge type calls (a concierge call requests a service like a ticket purchase in addition to a request for information), types of directory assistance listings being requested (business or personal), and, among business listings statistics regarding the categories of the listings requested and at what time certain categories are more popular.

This information has been used in the past to assist in marketing and advertising, updating of services, training of agents, etc. . . . However, there is a continued need to develop additional directory assistance metrics to improve the quality of the service.

OBJECTS AND SUMMARY

The present arrangement is directed to a system and method for collecting metrics data for directory assistance requests with substantially concurrent tracking of news events. Thereafter as certain news events repeat, the prior metrics-news analysis is used to provide better and faster results to future queries.

To this end, in one arrangement a system for responding to queries includes an interface for receiving request communications from requesters and an agent platform configured to receive the request communications and to provide replies to the requesters.

A tracking module tracks the request communications and the corresponding replies, a news module tracks news events and a correlation module correlates increases in request communications relative to a first news events over a set time frame.

An analysis module generates a search assistance routine based on the correlated increases in request communications relative to the first news events over a set time frame, wherein the search assistance routine is activated when a second news event is detected, similar to the first news event.

BRIEF DESCRIPTION OF THE DRAWINGS

The present invention can be best understood through the following description and accompanying drawings, wherein.

DETAILED DESCRIPTION

Figure 1:
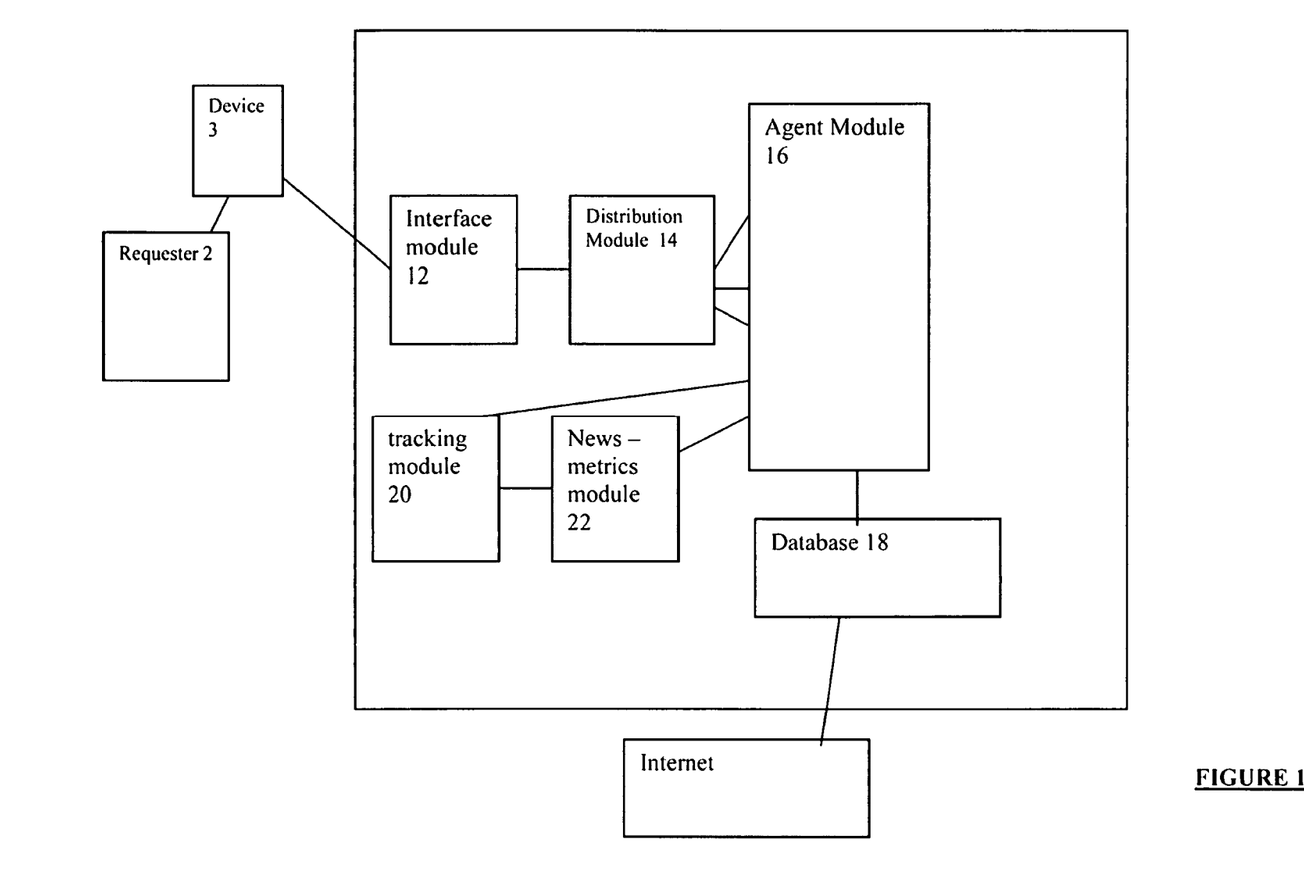
FIG. 1 is a system diagram for a directory assistance system, in accordance with one embodiment.

In one arrangement as shown in FIG. 1, a directory assistance system 10 maintains a communication interface module 12, a distribution processor module 14, an agent platform 16 a query database 18, and a tracking/metrics module 20. Directory assistance system 10 also maintains a news-metrics analysis module 22, described in more detail below.

FIG. 1 shows an exemplary directory assistance system 10. However, it is understood that many similar systems 10 (ie. call centers) may be geographically remote, but connected to one another forming a single connected system 10. For the purposes of illustration, all request handlings are shown with respect to one directory assistance system 10, but it is understood that any action described herein may be made at any request handling center within system 10. It is further understood that request communications to any one such system 10 may be distributed for load balancing or other considerations to other coupled systems 10.

A requester 2 is shown with a communications device 3 for connecting to communications module 12 of system 10 to send their query to an agent as described below. Device 3 may be any one of a telephone, a mobile telephone, a mobile electronic device, a desktop computer, laptop computer or any other such electronic communication device that may communicate a query to an agent, either by voice or electronic message.

System 10, has a communications interface module 12 configured to receive incoming requests to directory assistance system 10. In one typical arrangement, communications module 12 is configured to be a typical telephone call handling equipment for handling incoming requests from requesters 2 initiated by telephone. Additionally, it is contemplated that communications module 12 is configured to handle any form of incoming communication including, but not limited to HTML, SMS, chat (IM) format, WAP, VoIP communications, etc. . . .

In one arrangement, system 10 maintains a distribution processor module 14 which is either one of a telephone call distribution device, an electronic communication distribution device or some combination of the two.

As shown in FIG. 1, system 10 includes an agent platform 16 which is either one of a live agent arrangement, an automated platform or a combination of the two. Agent platform 16 is configured to receive incoming requests/queries, generated by requesters 2, from request communications interface 12 and distribution module 14.

It is understood that agent platform 16 is shown within system 10. However, live and automated agents may be located outside system 10 and may be outsourced to separate $3^{rd}$ parties. In one example, agent platform 16 may in part be a distributed network of autonomous agents, such as at home agents that maintain a search capability via system 10. The below features described below are applicable to any agent platform arrangement.

A typical directory assistance request may be for a specific contact information such as the telephone number for XYZ restaurant, or it may be for a category type search, such as for "a hardware store," presumably in the geographic location of requester 2. The geographic location of requester 2 may be known from any combination of several methods including GPS, triangulation, (ANI/MIN estimation based on call origination number), as provided by requester 2 (verbally or by text).

In addition to contact listing requests, the present arrangement is equally applicable to search queries to agent platform 16 for any generic information including atlas data, general knowledge, weather information, travel information, directions, trivia, media requests, concierge services, sports updates etc. . . . As noted above, such queries may be made by telephonic inquiry or be sent by electronic messaging.

Upon receipt at agent platform 16, the query is reviewed and an attempt is made to serve the request by searching in a database such as database 18. As shown, database 18 is shown as a single database within system 10. However, it is understood that database 18 may be a combination of connected databases and data hierarchies, being both proprietary or third party supported, which may be located within system 10 itself or remotely. Database 18 includes contact listing data (for traditional directory assistance requests) but also is configured to contain, or have access to, sufficient general data sufficient to allow requester 2 to either connect to a desired listing; (telephone numbers, addresses, e-mail information, web addresses, etc. . . . ) or obtain the desired information. It is noted, that ultimately, database 18 may simply be connected to one or more internet resources (proprietary or free services) as shown in FIG. 1.

After live or automated agents at agent platform 16 review the request, one or more data, either contact information or general data, is provided to requester 2 in response as discussed in more detail below.

In one arrangement, as shown in FIG. 1, system 10 includes a tracking/metrics module 20 which is used to track all of the actions within system 10 including but not limited to: voice data (ANI, time of call, party called, key word, category, SIC (Standard Industry Code), city, state, geo-location and more for all telephonic calls to the system), SMS/MMS data (ANI, request, time of request, the reply for all electronic communication requests to the system). From this data, as well as other system 10 data, tracking metrics module 20 may further track: the number of communications per time frame (to system 10); types and frequencies of concierge type calls (a concierge call requests a service like a ticket purchase in addition to a request for information); types of directory assistance listings being requested (business or personal); and, among business listings, statistics regarding the categories of the listings requested and at what time certain categories are more popular.

Figure 2:
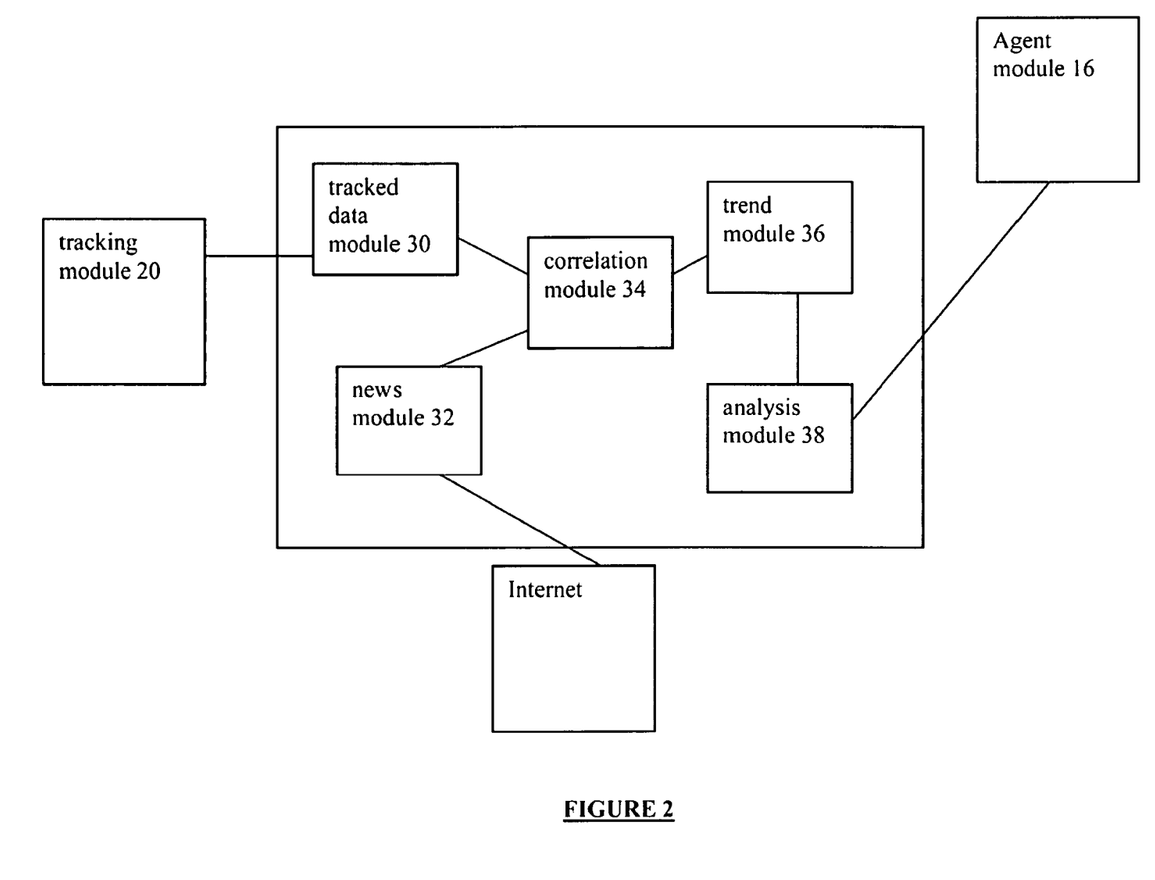
FIG. 2 is a diagram of a news-metrics analysis module of the directory assistance system of FIG. 1, in accordance with one embodiment.

In one arrangement, as shown in FIG. 2, a news-metrics analysis module 22 in system 10 maintains a metrics module 30, a news module 32 and a correlation module 34, a trend module 36 and an analysis results module 38. The metrics module 30 compiles and organizes the data as gathered by tracking/metrics module 20. The news module 32 gathers current news events using on-line type tracking and news service feed. The correlation module 34 correlates certain tracked spikes in requester activity against relevant news events within the same time frame. A more detailed description of the operations of these modules is set forth below in flow chart FIGS. 3-5.

In one embodiment trend module 36 is configured to receive data from metrics module 30, news module 32 and correlation module 34 and to provide a comparison between news events (time of occurrence/reporting) and the tracking data from metrics module 30 for serviced queries over the same time frame.

For example, for any given time frame X, a particular news event (eg. hurricane watch in Florida) is compared against queries services by system 10 over the same time period X, possibly by requesters 2 located in or near Florida. Trend module 36 looks for certain topical or specific query spikes within that sub-group of requesters and within the same timeframe X. For example, it may be found that in times of impending hurricanes, there are spikes in queries for emergency services contact numbers, home builder stores, etc. . . .

Obviously, the number of possible observed trends by trend module 36 is too extensive to detail in full. Some examples are given in more detail below in FIGS. 3-5. However, any similar tracking of events relative to tracked query replies are within the contemplation of module 36.

After one or more trends are developed by trend module 36, the various data is processed by analysis results module 38 which in turn develops search assistance routines 50 (discussed below) to assist agent platform 16 in addressing responses to future queries received during times when applicable news events occur.

For example, using the above example, during a news cycle of a Florida Hurricane, queries in the area for emergency services and home repair stores increased. Analysis results module 38 may produce a search assistance routine 50 to be used by agent platform 16 that prominently displays emergency services and home repair business listings to be used by agents as soon as such a news event occurs in the future.

In one arrangement, search assistance routines 50 developed in one geographic area may be used to apply against future similar news events detected in a different geographic location. For example, if a news event of a hurricane appears for Maryland/Delaware, agent platform 16 servicing requesters 2 from that location may have this search aide presented to them in the hopes of providing faster and accurate information to many expected queries over the time frame of the news event.

Such an arrangement, additional details of which are set forth in the following flow charts, allows past measured metrics-news event correlations to generate search assistance routines for agents to use when the same or similar news events occur in the future. In predicting that the occurrence of the same or similar type news events will result in similar request spikes, the search assistance routines assists in allowing agents to respond to queries quickly and accurately, without the need to continuously re-run searches through the database(s) and also helps to homogenize the answers given by the agents within system 10 for better quality control.

Also, because the search aids are generated based on actual past queries and not simply estimated search assistance routines, certain unforeseen spikes may be caught. For example, if during hurricanes, it is possible that there may be heightened queries for a particular esoteric business listing, such as a pub or restaurant that stays open during hurricanes or a brand of food such as a particular cereal. These listings may then be added to the search assistance routine for future similar news events even though they are not the normal expected type of queries related to hurricanes.

Figure 3:
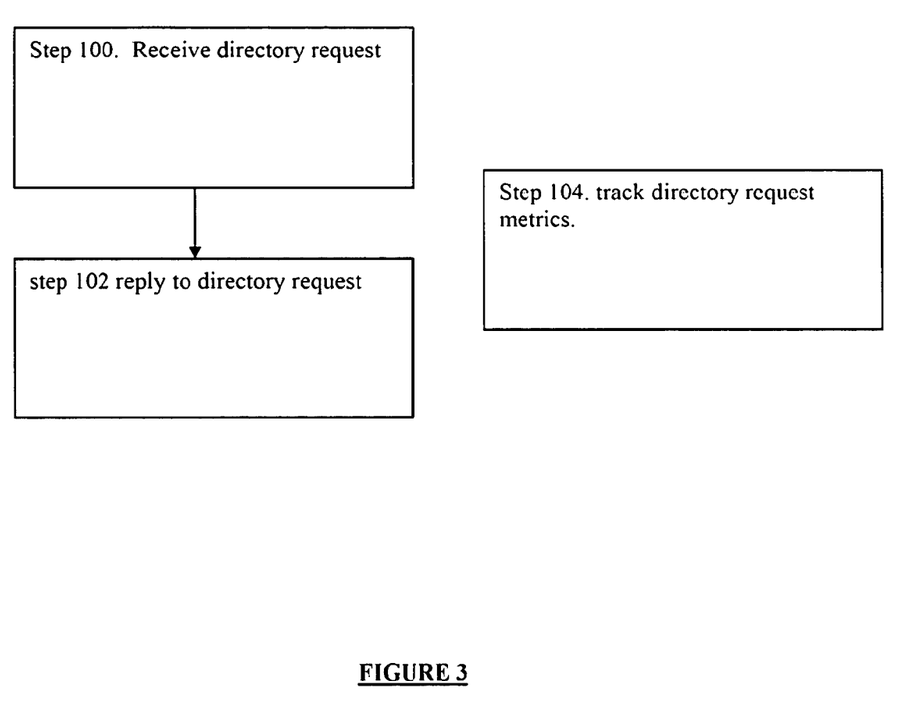
FIG. 3 is a flow chart illustrating the monitoring of various directory assistance metrics in accordance with one embodiment.

Turning to the operation of system 10 and the examples of metric/news trend analysis, in one arrangement, as shown in flow chart FIG. 3, at step 100, requester 2 generates a query and sends it to (or calls) system 10, where the communication is received at interface 12, forwarded to distribution module 14 and eventually is received at agent platform 16.

At step 102, once the request is in, the live or automated agent of module 16 searches database 18 (or other connected third party sources including a general internet search). Once the result is found, it is delivered or otherwise communicated back to requester 2. It is understood that typical directory assistance enhancements such as a preferred delivery methods for query responses, preferred language etc. . . . , may be implemented based on a requester 2 profile stored with system 10.

At step 104, before, concurrently or after steps 100 and 102 above, tracking module 20 records any number of metrics/request details related to the request.

For example, tracking module 20 may record voice data (ANI, time of call, party called, key word, category, SIC (Standard Industry Code), city, state, geo-location and more), SMS/MMS data (ANI, request, time of request, if 2-Way SMS it may include the reply) as well as other web enabled DA query data. Other system metrics may be recorded including the handling time, accuracy of the data, sources used for obtaining the reply, etc. . . .

In one arrangement, all requests to system 10 are recorded by tracking module 20, but it is also contemplated that tracking module 20 may, for some applications, record only certain sub-demographics (geographic location specific, time specific, yellow pages requests only, etc. . . . ) or may simply record a limited percentage of requests for representative purposes and to conserve system resources.

Figure 4:
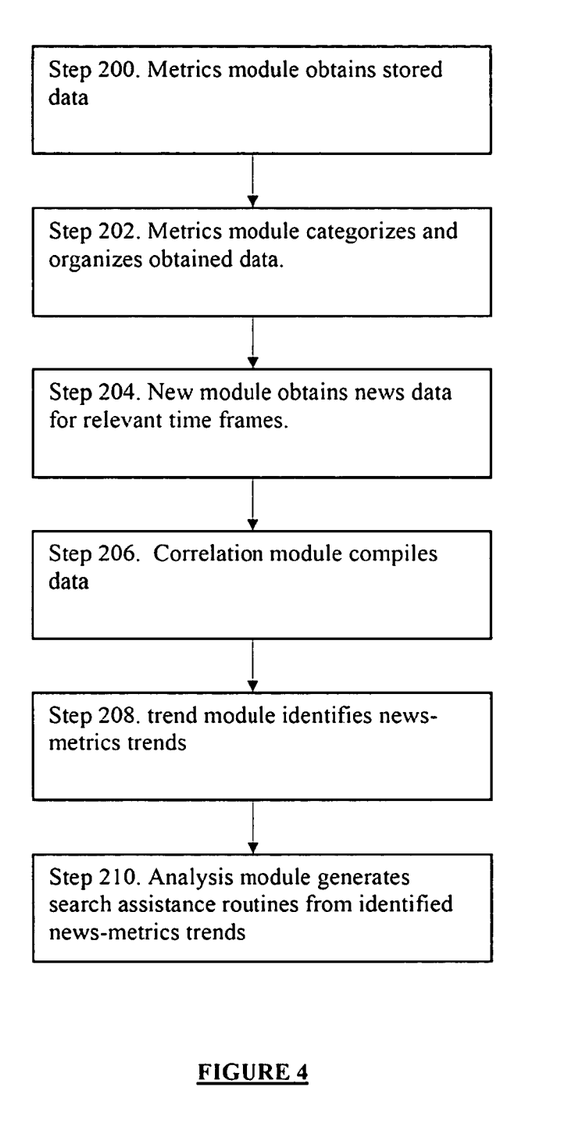
FIG. 4 is a flow chart illustrating the generation of news-metric analysis in accordance with one embodiment.

In one arrangement, as shown in FIG. 4, at step 200, metrics module 30 of metrics/analysis module 22 obtains the stored data from tracking module 20. At step 202, metrics module 30 may categorize and otherwise organize the stored metrics results. For example, metrics module 30 may look for spikes in any one of the various metrics.

In a first example, metrics module 30 may find a large spike in requests for a music artist over time frame X. In another example, metrics module may find a spike in requests for certain food recipes over time frame Y, and by certain demographics (eg. under 30's). Obviously, there are too many examples to exhaustively list. However, it is understood that metrics module 30 may use any criteria available to identify certain events (metrics anomalies) either generally across all requests to system 2 or among a specific demographic.

At step 204, after various events and associated metrics data are identified by metrics module 30, news module 32 searches for various related news stories that occurred during an identified time period that coincides with the metrics spikes, possibly related to the subject metrics.

For example, if a particular business telephone number was requested very heavily (eg. 200% more than normal frequency) over the period of Apr. 1, 200X-Apr. 8, 200X, news module 32 may search for news events related to the business that occurred on or about the same time frame as the metrics event.

In another example, in a simple information query for a certain celebrity, if their information was requested very heavily (eg. 200% more than normal frequency) over the period of Apr. 1, 200X-Apr. 8, 200X, news module 32 may search for news events related to that celebrity that occurred on or about the same time frame as the metrics event.

At step 206, correlation module 34 of news metrics module 22 compiles the above gathered material in order to match the metrics spikes with the possible correlated news events from the same time frames.

At step 208, trend module 36 reviews the correlated data produced by correlation module 36 and produces a series of news-metrics trends, or in other words a series of directory assistance query spikes that in some way form a nexus with a related news event.

Using the above examples, the increase of a particular business telephone listing request may have coincided with the news that the business is offering a new advertising campaign. The increase in requests for the celebrity may have coincided with a news release by the celebrity or even death of that celebrity. As noted above, the metrics news nexuses identified by trend module 36 may be obviously related or not. In the example of a hurricane, it is likely (predictable) that a news-metrics nexus will show a spike in disaster preparedness and emergency services requests. However metrics news nexuses, because they are generated from actual recorded past activity, may also identify smaller, possibly local, trends for rises in specific restaurant/pub listings, general information requests for certain foods or events for non-electronic game activities (in cases of power failures)

In one arrangement, the news-metrics trends may be identified by trend module 36 based on the general request volume to system 10 or it may identify trends from certain subsets of requesters 2, such as women 18-25, men 18-25, seniors, late night requests, (self identified) movie fans (from profile) etc. . . .

In another arrangement, trend module 36 may use any time frame basis (from news module 32 and tracking module 30) for identifying the news-metrics trends, including but not limited to hour by hour, daily overviews, weekly over-views, monthly & yearly overviews etc. . . . It is further noted that, although the above description is in a logically chronological order, it is contemplated that all events may be monitored on a real-time basis with trend module 36 identifying metrics-news nexus/trends in real time.

Once the news-metrics trends are identified by trend module 36, at step 210, analysis-results module 38 generates a search assistance routine 50 (See FIG. 6 below). Routine 50 is a routine for generating a screen, for live operators, or subroutine, for automated operators, that provides search assistance to the agent module 16 to handle information requests that are of a similar type that generated the routine 50.

A search assistance routine 50 is a routine that is applicable for generating a search assistance display 52, described below, to assist the agents at agent module 16. A routine 50 is generated as the primary search assistance as the particulars of a display 52 are obviously set, at least in part, on a case by case basis. For example, if a celebrity death produces a corresponding search spike for biography data, memorial data, listings that sell videos/movies, etc. . . . , this may generate a routine 50 for use during future similar events. However, the routine 50 is generic to the type of event. The actual data presented in a corresponding display 52 after the detection of a similar news event is particular to that news event (ie. related to the celebrity that triggered the use of routine 50)

Returning to the formation of search assistance routine 50, for example, if trend module 36 identified a spike in traffic for a celebrity shortly after their death, then analysis results module 38 generates a search assistance routine 50 that would push certain data to agent module 16 upon the death of other celebrities in the future. This search assistance routine 50 may include a series of resources relating to the survey or even a text biography of the celebrity.

In another example, if trend module 36 identified that during a certain weather event (hurricane), calls to home building suppliers rose 500% and there was a large increase in emergency contact requests, then routine 50 may include a short list of home building suppliers as well as a listing of local emergency contacts. If the prior news event causes a detection of a spike in requests for a particular contact in a certain geographic area, the search assistance routine 50 developed may include a generic search assistance routine (non-geographically specific) as well as a sub-version for search assistance routine 50 including instructions for displaying the particular listing but only if the future news event that triggers the use of search assistance routine 50 occurs in the same geographic region.

In another example, data recorded by tracking module 30 may show a real time increase in searches for a particular movie. This real time increase may correlate to the beginning of an advertising campaign or some other triggering event detected by news module 32. Simultaneously, system 10 may also record a corresponding rise in requests related to movie theatre contact information, concierge services for movie ticket reservations etc. . . . In such an instance, trend module 38 may quickly develop a routine 50 that causes system 10 to respond by preparing a search assistance routine 50 for agent module 16 even within the same news cycle (as well as for use in handling similar events in the future).

It is further contemplated that in addition to providing a search assistance routine 50 for assisting agents, search assistance routine 50 may also be used by system 10 to prepare for handling increased requests by providing additional or even certain types of agents capable of handling such incoming requests (eg. for concierge services).

Using such data, the system 10 develops predictive algorithms or strategies for service offerings based on how system 10 predictively reacts to news events in the future. Thus, rises in a particular type of external data may be seen to predict a rise in expected related queries to system 10 in the near future, with corresponding service actions taken to address such an expected rise.

Furthermore, it is known to provide various forms of advertisements to users of a directory assistance systems, such as system 10. In another embodiment of the present invention, the metric comparisons discussed above, including the developed search assistance routine 50 may be used to influence what types of advertisements are played to certain callers and at what times. For example, if a search assistance routine 50 notes that a particular category of business is requested during a news event, then upon the detection of a new news event that will trigger use of search assistance routine 50, businesses within that category may bid or pay to be the primary or even only listing shown in the search assistance window 52. Such a feature may be nationwide or geographically specific.

This arrangement not only improves the experience of requester 2 by providing more relevant advertising but also provides the advertisers with knowledge that their advertisements are dispensed to users of the directory assistance system likely to be interested in the advertisements.

In another example, when a real-time increase is noted in searches for a particular movie, (tied to a news event), system 10 may not only adjust the operations with a search assistance routine 50 for immediate (and future similar news events), but may even offer targeted advertising space pushing or highlighting certain movie related advertisements, advertisements for restaurants in the vicinity of movie theaters etc. . . .

Figure 5:
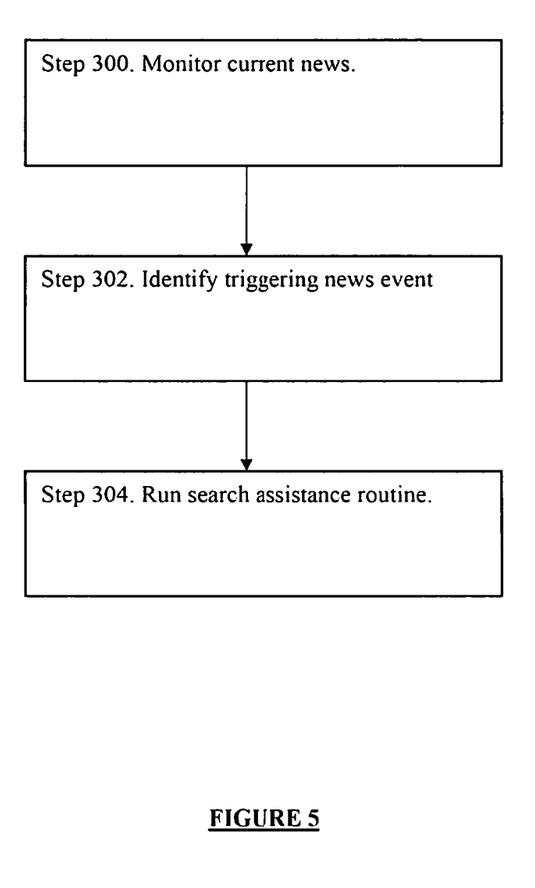
FIG. 5 is a flow chart of the operation of the directory assistance system of FIG. 1 using the news-metrics analysis in accordance with one embodiment.

Turning to the implementation of search assistance routine 50 as a search assistance window 52, in one embodiment, as shown in the flow chart FIG. 5, at step 300, news module 32 of news-metrics module 22 continuously monitors one or more news sources, such as internet news databases. News module 32 continues to review the news sources for events that may "trigger" one of the routines 50 developed by analysis module 38 as described above.

For example, if a search assistance routine 50 was identified for a celebrity death then news module 32 may search for similar events in the current news. Likewise, if a search assistance routine 50 was identified for a weather event, then news module 32 may search for a similar impending events in the current news. If a search assistance routine 50 was identified for a new movie release then news module 32 may search for additional upcoming movie release events in the current news. News events are monitored on a real time basis and may be tracked using one or more news sources.

At step 302, once a conforming news event, as set forth above is identified, analysis module 38 forwards the search assistance routine 50 to agent module 16.

Figure 6:
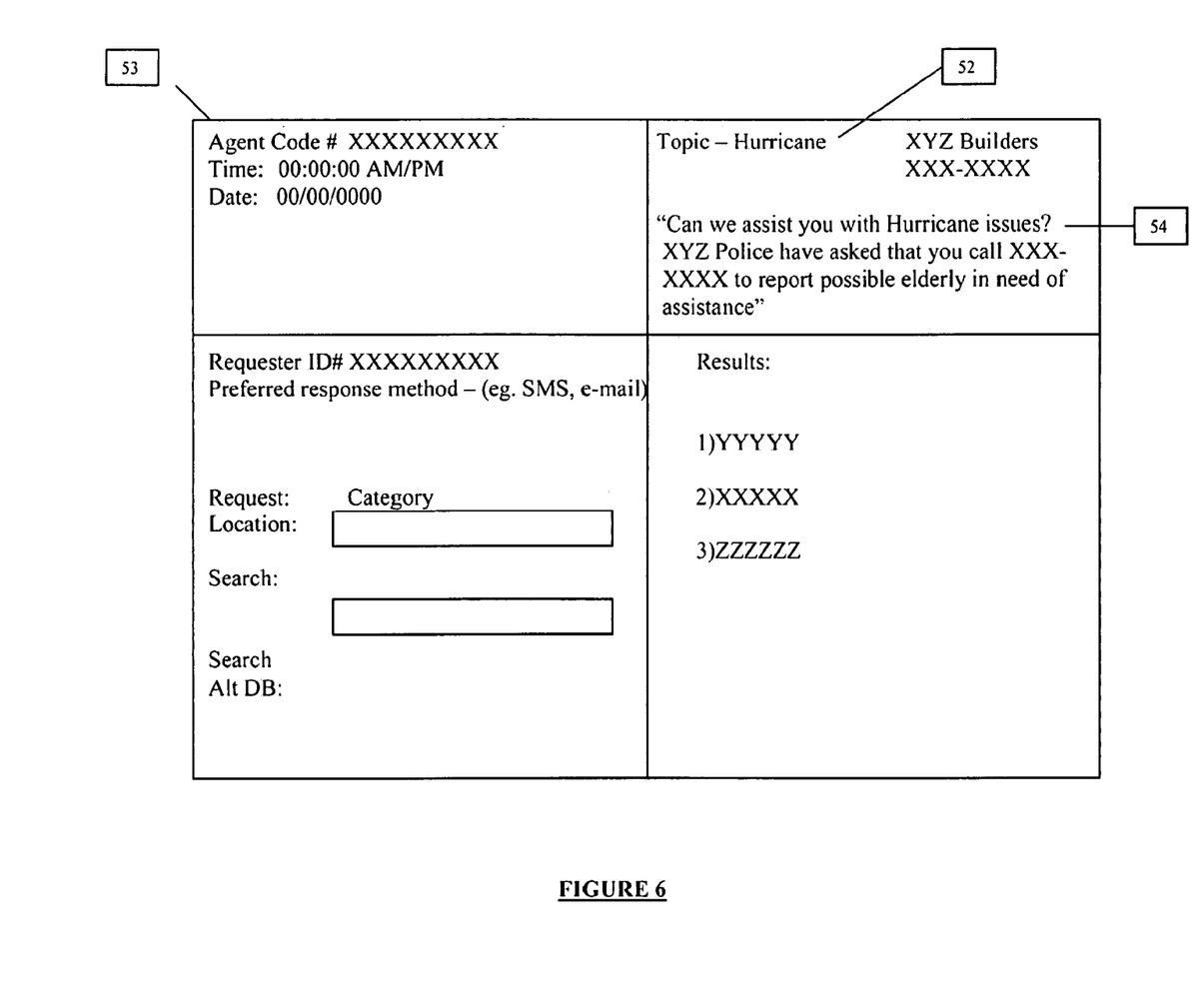
FIG. 6 shows an exemplary agent screen for handling a query, in accordance with one embodiment.

At step 304, agent module 16 may run a stored routine 50 to generate a search assistance display 52, as shown in FIG. 6. Search assistance display 52 is a small sub window displayed over or within the ordinary search window 53 (in top right corner as pictured) that is intended to provide a quick reference, related to the news event, that is likely to be able to provide a quick set of answers (or sources for answers) that may be used for agent module 16.

For example, according to one embodiment, if a search assistance routine 50 identifies a weather event for a certain spike in related search requests then, search assistance display 52 may show two geographically local (to requester 2) building material suppliers as well as emergency numbers of the fire, police, red cross and special hurricane instructions numbers.

It is contemplated that not all request communications to system 10 will be for the material in search assistance display 52. In such cases the normal search is conducted on screen 53. However, owing to the impending news event (step 302) it is expected that a heightened number of requesters 2 are requesting information from search assistance display 52 and that such requests may be answered more quickly and completely. Moreover, because the search assistance screen 52 is the same for all of the agents at agent module 16 the response to the heightened queries will likely be more homogenous, improving overall response quality for system 10.

In one arrangement, local emergency services may actually provide direct "text quotes" 54 with emergency instructions or other emergency news to be included in search assistance display 52.

In another example, in the event that the identified news event is a new movie release, and analysis module 38 has created a search assistance routine 50 for such instances in the future, search assistance display 52, may include a brief statement of the movie release date, links to concierge services within system 10, links for popular (frequently requested) nearby restaurants etc. . .

It is noted that for automated agents at agent platform 16, search assistance display 52 may be implemented as a voice command sub-routine rather than a visible window for a live agent.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A system for responding to queries, said system comprising: an interface for receiving request communications from requesters; an agent platform configured to receive said request communications and to allow agents to provide replies to said requesters; a tracking module for tracking said request communications and said replies; a news module for tracking news events based on information provided by news service feed; a correlation module for correlating increases in the number of request communications relative to a first type of news event over a set time frame; and an analysis module configured to generate a search assistance routine based on said correlated increases in the number of request communications relative to said first type of news event over a set time frame, said search assistance routine configured to assist said agents in responding during a second news event, wherein said search assistance routine is activated when a second news event is detected, having a type similar to said first type of news event.

2. The system as claimed in claim 1, wherein said request communication to said system may be any one of a telephonic communication or a text communication.

3. The system as claimed in claim 1, wherein an agent platform is any one of a live operator platform, an automated agent platform and a geographically distributed agent network.

4. The system as claimed in claim 1, wherein said tracking module tracks any one of voice data (ANI, time of call, party called, key word, category, SIC (Standard Industry Code), city, state, geo-location and more for all telephonic calls to the system), SMS/MMS data (ANI, request, time of request, the reply for all electronic communication requests to the system), the number of communications per time frame, types and frequencies of concierge type calls, types of directory assistance listings being requested (business or personal), and statistics regarding the categories of the listings requested and at what time certain categories are more popular.

5. The system as claimed in claim 1, wherein said news module tracks news events in real time.

6. The system as claimed in claim 1, further comprising a trend module, configured to receive said increases in request communications relative to a first news events over a set time frame as identified by said correlation module to identify a particular news triggering event that results in a sub-set of set of increased request communications.

7. The system as claimed in claim 1, wherein said search assistance routine is generated in real time.

8. The system as claimed in claim 1, wherein said search assistance routine is geographically generic.

9. The system as claimed in claim 1, wherein said geographically generic search assistance routine includes a geographically specific sub-routine.

10. The system as claimed in claim 1, wherein said search assistance routine is geographically specific.

11. The system as claimed in claim 1, wherein when said second news event is detected said search assistance routine is activated resulting in the generation of a search assistance window.

12. The system as claimed in claim 11, wherein said search assistance window is populated to said agent platform.

13. The system as claimed in claim 11, wherein said search assistance window may include paid advertisements.

14. The system as claimed in claim 11, wherein said search assistance window may include text material to be provided to said requester.

* * * * *